3,415,775
BLENDS OF N-ALKYL-N'-ARYL PHENYLENE DIAMINES AND A CARRIER
Richard T. Solsten, St. Albans, W. Va., assignor to Monsanto Company, St. Louis, Mo., a corporation of Delaware
No Drawing. Filed Mar. 29, 1966, Ser. No. 538,201
10 Claims. (Cl. 260—41.5)

ABSTRACT OF THE DISCLOSURE

Solid free-flowing rubber antidegradant compositions are prepared from low-melting N-alkyl-N'-aryl-p-phenylenediamines by absorption on a carbon black carrier having a BET surface area within the range of 25 to 88 m.$^2$/g., oxygen content within the range of 0.15 to 1.00% and mineral oil absorbency within the range of 0.75 to 1.45% cc./g. the ratio of diamine to carbon black being substantially 50/50.

---

This invention relates to N-alkyl-N'-aryl phenylene diamine rubber antidegradants and their incorporation into rubber. More particularly, the invention relates to blends of an N-alkyl-N'-aryl phenylene diamine and a carbon black, the black acting as a carrier for the antidegradant.

Handling problems are common to the N-alkyl-N'-aryl phenylene diamines. The antidegradant N-1,3-dimethylbutyl-N'-phenyl-p-phenylene diamine in a solid state is a crystalline material which is difficult to handle because of its low melting point of about 40° C. At about 40°–50° C. the compound is a semi-solid mass.

An object of this invention is to promote the progress of science and useful arts. A further object is to provide N-alkyl-N'-aryl phenylene diamines in free flowing, solid forms for the rubber industry. A further object is to provide N-1,3-dimethylbutyl-N'-phenyl-p-phenylene diamine in a dry form, free of dust and caking problems. A further object is to provide N-1,3-dimethylbutyl-N'-phenyl-p-phenylene diamine in a form with good handling characteristics. A further object is to provide N-1,3-dimethylbutyl-N'-phenyl-p-phenylene diamine in a form with good shelf life. A further object is to provide N-1,3-dimethylbutyl-N'-phenyl-p-phenylene diamine in a form with antidegradant properties equal to or better than this compound added undiluted to rubber formulations. Other objects will become apparent as the description of my invention proceeds.

I have discovered that a blend of N-alkyl-N'-aryl phenylene diamine and a carbon black provides an outstanding improvement for incorporating this type antidegradant into rubber. It is preferred that the carbon black used have a low surface area, low oxygen content, an absorbency favorable for a 50% blend and a product form which will not have fines. Studebaker, in vol XXX, No. 5, Rubber Chemistry and Technology, December, 1957, at page 1430 outlines the expected range in primary properties for various types of rubber-grade carbon blacks. The suitable blacks for this invention include those within the following ranges as outlined by Studebaker.

| | |
|---|---|
| BET surface area, m.$^2$/g. | 25–88 |
| Percent oxygen | 0.15–1.00 |
| Mineral oil absorbency cc./g. | 0.75–1.45 |

These ranges include general purpose furnace blacks, high modulus furnace blacks, fine furnace blacks, fast extrusion furnace blacks, and high abrasion furnace blacks. The BET method of determining surface area is based on nitrogen absorption. See Studebaker at 1412. The fast extrusion furnace carbon black trademarked Philblack A is the preferred carrier for N-1,3-dimethylbutyl-N'-phenyl-p-phenylene diamine. The Rubber Chemicals Division of Phillips Chemical Company lists the surface area (nitrogen absorption) for Philblack A as 44 square meters/gram in its Bulletin P-21, Copyright 1960, Phillips Chemical Company 6-60-6000 at page 5. The mineral oil absorbency for Philblack A is reported to be within the range of 1.15–1.45 cc./gram. (Studebaker at 1430.) At 1422 Studebaker lists the mineral oil absorbency of Philblack A as 1.34 cc./g. The oxygen content for Philblack A is reported to be 0.42%. (Studebaker at 1425.) The oxygen content reported by Studebaker is determined by difference from combustion analysis after drying at 150° C. for one hour in a stream of dry, inert gas such as nitrogen. See Studebaker at 1416. Physically adsorbed gases like oxygen, moisture, carbon dioxide, etc. were ignored by Studebaker but may be a factor in the stability of blends used as examples, infra. Therefore, the oxygen content data used herein is for defining the carbon black. Both oxygens, i.e. oxygen content determined by difference and oxygen present as adsorbed gases, may hinder stability of the various blends.

A blend of this invention is prepared by adding a charge of pelletized Philblack A to a suitable tumbling blender. While the carbon black is agitated in the blender, N-1,3-dimethylbutyl-N'-phenyl-p-phenylene diamine heated to about 70° C. is sprayed onto the carbon black. The feed time is not critical, but ten minutes is a reasonable period. The hot, liquid N-1,3-dimethylbutyl-N'-p-phenylene diamine is somewhat sensitive to exposure to oxygen and appropriate precautions should be taken, for example storage under inert atmosphere. A 50±1% blend is preferred. However, a 50±3% blend can be tolerated. A 50% blend avoids both dustiness and caking. Blends having high antidegradant content will lack good caking resistance whereas low antidegradant content will have more fines. Philblack A's absorbency is such that a 50% antidegradant blend is a good compromise between excessive fines and low caking resistance. If the antidegradant is seriously undercharged, the blend will be fine, dusty and dirty. Gross overcharge of antidegradant will result in an unmanageable mass in the blender. After completion of the feed, the batch should be blended for an additional few minutes to assure uniformity.

Because of the sticky nature of the hot blend, the blend will be agglomerated by the rotary motion of the blender. The degree of agglomeration will vary depending on the antidegradant content of the material and the type blender used. Particles as large as marbles are easily formed with batches of 52% N-1,3-dimethylbutyl-N'-phenyl-p-phenylene diamine content. Generally, the largest agglomerate is pea sized. Within limits, agglomeration is desirable. The larger particle, having relatively lower surface area, generally has better stability and caking properties, and the amount of fines is also reduced. From the standpoint of agglomeration, Philblack A is again the choice carrier.

The blends of this invention are dry, solid, free-flowing pellets at room temperature. They are surprisingly free of dust, and caking problems are minimal. The pellets are relatively free of handling problems, and have good shelf life. Ozone resistance of aged rubber stocks is improved using a blend of this invention instead of undiluted N-1,3-dimethylbutyl-N'-phenyl-p-phenylene diamine.

Rubber ozone resistance data for a blend of this invention are reported in Table I, infra. The method used for measuring the ozone damage to vulcanized rubber is described by Decker and Wise, The Stress Relaxation Method for Measuring Ozone Cracking, Rubber World, April 1962, p. 66. The equipment used in these tests is comprised of a Blue M Electric Oven used as an ozone cabinet. This is a product of the Blue M Electric Company of Blue Island, Illinois. The cabinet is modified with Hanovia ozone generating equipment. Six quartz lamps are installed in the air chamber beneath the oven floor. The ozone concentration in the cabinet is controlled with the lamps. The ozone concentration in the chamber can be controlled within ±5 from 10 to 200 parts per hundred million parts of air. The cabinet is equipped with a rack for static testing and one for dynamic testing. The static rack handles 12 stocks at strains of 5, 10, 20, 30, and 40%. The dynamic tester is a reciprocal mechanism which imparts 25% strain to the rubber test pieces. The top plate of the dynamic tester moves up and down, and the bottom plate is stationary. The tester is driven at a rate of 90 cycles per minute by a gear motor mounted on the outside of the cabinet. The test pieces of rubber are two-inch long T–50 (ASTM D 599–55) specimens dyed from standard stress strain test sheets (ASTM D 15–57T). They are mounted by placing their ends in the radial slots milled into the edges of the circular plates of the racks. The tab ends fit into the circumferential grooves machined into the outer surface of the plates.

The stress relaxation method is based on the principle that the effective cross-sectional area of a small test piece of rubber is reduced by ozone cracking. The extent of cracking in a test piece is determined by measuring the forces required to extend the test piece 100% before and after exposure to ozone. As the strip begins to crack, the number of stress-supporting rubber chains decreases, and the force required to extend the strip 100% is reduced. The ratio of this force to the original force is calculated at approximately sixteen-hour intervals of exposure to ozone. The graph of force vs. time is essentially a straight line, and the time required for attaining 90%, 80%, and 70% of the original force is readily determined from the graph. The ability of the rubber to resist ozone attack is obtained by comparison of these numbers. These ratios are the percent or original modulus of the rubber test piece and are listed as percent retention in Table I, infra. The ozone concentration for the tests is 25 parts ozone per hundred million parts of air. Longer times in the data demonstrate better ozone resistance of the rubber stock. The intermittent test comprises two-hour cycles during which the specimens are exposed dynamically 15% of the time and during the remaining time of the cycle are exposed statically at 25% strain.

The tables also include curing characteristics of rubber stocks containing a blend of this invention. Curing characteristics are determined by means of the Monsanto Oscillating Disc Rheometer, described by Decker, Wise, and Guerry in Rubber World, December, 1962, page 68. From the rheometer data, $t_2$ is the time in minutes for a rise of two rheometer units above the minimum reading, and $t_{90}$ is the time required to obtain a modulus 90% of the maximum.

Table I illustrates comparisons of rubber stocks containing N-1,3-dimethylbutyl-N'-phenyl-p-phenylene diamine added undiluted and stocks containing N-1,3-dimethylbutyl-N'-phenyl-p-phenylene diamine in blends of this invention. The antidegradant code for the seven stocks is as follows:

| Stock | Antidegradant |
|---|---|
| 1 | None. |
| 2 | 1.5 phr N-1,3-dimethylbutyl-N'-phenyl-p-phenylene diamine. |
| 3 | 3.0 phr. N-1,3-dimethylbutyl-N'-phenyl-p-phenylene diamine. |
| 4 | 4.5 phr. N-1,3-dimethylbutyl-N'-phenyl-p-phenylene diamine. |
| 5 | 3.0 phr. 50% blend of N-1,3-dimethylbutyl-N'-phenyl-p-phenylene diamine and Philblack A. |
| 6 | 6.0 phr. 50% blend of N-1,3-dimethylbutyl-N'-phenyl-p-phenylene diamine and Philblack A. |
| 7 | 9.0 phr. 50% blend of N-1,3-dimethylbutyl-N'-phenyl-p-phenylene diamine and Philblack A. |

The rubber stock used in Table I is a B–6 masterbatch comprised of the following:

| | Parts |
|---|---|
| Styrene-butadiene rubber 1500 | 100.0 |
| * Philblack A | 40.0 |
| Zinc oxide | 3.0 |
| Stearic acid | 2.0 |
| Hydrocarbon softener | 5.0 |
| Wax | 3.0 |
| Sulfur | 1.75 |
| N-tert.-butyl-2-benzothiazolesulfenamide | 1.0 |

* Philblack A added to stocks to give overall compositions identical to corresponding blend stocks.

The ozone resistance data illustrate improved properties using blends of this invention over undiluted N-1,3-dimethylbutyl-N'-phenyl-p-phenylene diamine in aged rubber samples in both dynamic (stock 6 compared to stock 3) and intermittent (stock 7 compared to stock 4) tests.

TABLE I

| | Stock (hrs.) | | | | | | |
|---|---|---|---|---|---|---|---|
| | 1 | 2 | 3 | 4 | 5 | 6 | 7 |
| UNAGED | | | | | | | |
| Dynamic ozone resistance: | | | | | | | |
| 90% retention | 1 | 9 | 28 | 52 | 10 | 29 | 52 |
| 80% retention | 2 | 18 | 52 | 88 | 21 | 52 | 89 |
| 70% retention | 4 | 28 | 72 | 118 | 32 | 72 | 117 |
| Intermittent ozone resistance: | | | | | | | |
| 90% retention | 8 | 40 | 80 | 190 | 40 | 90 | 180 |
| 80% retention | 17 | 70 | 147 | 223 | 68 | 144 | 240 |
| 70% retention | 23 | 91 | 190 | 235 | 90 | 180 | 260 |
| Static ozone resistance: | | | | | | | |
| 90% retention | 250 | 256 | 256 | 256 | 256 | 256 | 256 |
| 80% retention | 256 | 256 | 256 | 256 | 256 | 256 | 256 |
| 70% retention | 256 | 256 | 256 | 256 | 256 | 256 | 256 |
| AGED | | | | | | | |
| Dynamic ozone resistance: | | | | | | | |
| 90% retention | 3 | 11 | 24 | 52 | 14 | 33 | 48 |
| 80% retention | 6 | 22 | 45 | 79 | 25 | 50 | 73 |
| 70% retention | 8 | 32 | 43 | 102 | 37 | 64 | 93 |
| Intermittent ozone resistance: | | | | | | | |
| 90% retention | 24 | 46 | 88 | 126 | 50 | 80 | 118 |
| 80% retention | 36 | 69 | 124 | 147 | 72 | 113 | 190 |
| 70% retention | 45 | 88 | 158 | 161 | 93 | 144 | 224 |
| Static ozone resistance: | | | | | | | |
| 90% retention | 160 | 256 | 256 | 256 | 256 | 256 | 256 |
| 80% retention | 216 | 256 | 256 | 256 | 256 | 256 | 256 |
| 70% retention | 256 | 256 | 256 | 256 | 256 | 256 | 256 |

Table II illustrates the maintenance of curing characteristics of rubber stocks using blends of this invention compared to rubber stocks wherein N-1,3-dimethylbutyl-N'-phenyl-p-phenylene diamine is added undiluted. Stress-strain data are also illustrated in Table II. The stocks of Table II are identical to those of Table I and they are cured in a B–6 masterbatch.

TABLE II

| Stock | 1 | 2 | 3 | 4 | 5 | 6 | 7 |
|---|---|---|---|---|---|---|---|
| Rheometer at 153° C.: | | | | | | | |
| $t_2$ Minutes | 20.6 | 15.4 | 14.0 | 13.1 | 15.4 | 13.8 | 13.2 |
| $t_{90}$ Minutes | 35.5 | 28.8 | 26.5 | 25.9 | 28.8 | 26.4 | 25.5 |
| Stress-strain: | | | | | | | |
| Ultimate elongation, percent | 510 | 540 | 510 | 500 | 520 | 510 | 520 |
| Ultimate tensile strength, p.s.i. | 2,400 | 2,600 | 2,400 | 2,300 | 2,500 | 2,400 | 2,500 |
| Modulus 300%, p.s.i. | 1,260 | 1,260 | 1,370 | 1,360 | 1,390 | 1,360 | 1,420 |

Degradation of the blends of this invention is minimal. Commercial N-1,3-dimethylbutyl-N'-phenyl-p-phenylene diamine normally loses 2–15% in assay after heating four weeks at 50° C. depending upon the conditions of exposure. A typical result after exposure of a one-gram sample having an exposed area of 1 in.² exposed to the atmosphere in a watch glass is recorded in Table III below. The exposure of a 50/50 blend with carbon black having a BET surface area within the range of 42–46 m.²/gram, oxygen content within the range of 0.15 to 0.65%, and mineral oil absorbency within the range of about 1.15 to 1.45 cc./g. (Philblack A) resulted in a slightly lower assay, but a 50/50 blend with carbon black having a BET surface area within the range of 95–135 m.²/g., mineral oil absorbency within the range of 1.25–1.45 cc./g., and oxygen content within the range of 0.75 to 1.45 (Philblack I) degraded significantly more. Philblack I is an intermediate super abrasion furnace black. Both blends were free flowing and non-dusty at the start of the test.

TABLE III

| Material: | Loss in assay after 4 weeks at 50° C. |
|---|---|
| N-1,3-dimethylbutyl-N'-phenyl-p-phenylene diamine | 13.9 |
| 50/50 blend of N-1,3-dimethylbutyl-N'-phenyl-p-phenylene diamine with Philblack A | 17.9 |
| 50/50 blend of N-1,3-dimethylbutyl-N'-phenyl-p-phenylene diamine with Philback I | 26.3 |
| 50/50 blend of N-1,3-dimethylbutyl-N'-phenyl-p-phenylene diamine with Philblack O | 19.0 |

On the other hand a 50/50 blend with carbon black having a BET surface area within the range of 20–35 m.²/g. and a mineral oil absorbency within the range of 0.75–0.90 cc./g. exhibits severe caking and stickiness after one week at 50° C. Philblack O's loss in assay is slightly more than Philblack A. Philblack O is a high abrasion furnace black. For non-caking, non-dusting, and long shelf life, it is preferred to have a mineral oil absorbency of 1.15 to 1.45 cc./g. and BET surface area of 36 to 88 m.²/gram. The BET surface area of the general purpose, high modulus, fine and fast extrusion furnace blacks falls within the range of 25 to 75 m.²/g. The BET surface area of the FEF blacks falls within the range of 36 to 48 m./g. according to Studebaker, supra, page 1430.

Results comparable to those described in the tables above are obtained using other blends of this invention. Other N-alkyl-N'-phenyl-p-phenylene diamines may be blended to provide compositions having improved physical form. In general, compounds of said class wherein the alkyl contains 1–19 carbon atoms protect rubber from ozone and may be formulated according to this invention. Illustrative examples of other suitable antidegradants comprise N-sec. butyl-N'-phenyl-p-phenylene diamine, N-isopropyl-N'-phenyl-p-phenylene diamine, N-n-hexyl-N'-phenyl-p-phenylene diamine, N-n-octyl-N'-phenyl-p-phenylene diamine, and N-sec. octyl-N'-phenyl-p-phenylene diamine.

It is intended to cover all changes and modifications of the examples of the invention herein chosen for purposes of disclosure which do not constitute departures from the spirit and scope of the invention.

What is claimed is:

1. A free-flowing, solid rubber antidegradant comprised of a low-melting N-alkyl-N'-aryl phenylene diamine wherein alkyl contains 1 to 19 carbon atoms absorbed on a carrier of furnace carbon black having a BET surface area within the range of about 25 to about 88 m.²/g., an oxygen content within the range of about 0.15 to about 1.00%, and a mineral oil absorbency within the range of about 0.75 to about 1.45 cc./g., the ratio of diamine to carbon black being substantially 50/50.

2. A rubber antidegradant composition according to claim 1 wherein the carbon black is in pellet form.

3. A free-flowing, solid rubber antidegradant comprised of N-1,3-dimethylbutyl-N'-phenyl-p-phenylenediamine absorbed on a carrier of furnace carbon black having a BET surface area within the range of about 25 to about 75 m.²/g., an oxygen content within the range of about 0.15 to about 0.65%, and a mineral oil absorbency within the range of about 0.75 to about 1.45 cc./g., the ratio of diamine to carbon black being substantially 50/50.

4. A rubber antidegradant composition according to claim 3 wherein the carbon black is in pellet form.

5. A rubber antidegradant composition according to claim 1 wherein
the alkyl group of the antidegradant has from 4 to 8 carbon atoms and
the carbon black has a BET surface area within the range of about 36 to about 88 m.²/g., an oxygen content within the range of about 0.15 to about 1.00%, and a mineral oil absorbency within the range of about 1.15 to about 1.45 cc./g.

6. A rubber antidegradant composition according to claim 5 wherein the carbon black is in pellet form.

7. A rubber antidegradant composition according to claim 1 wherein
the antidegrandant is N-1,3-dimethylbutyl-N'-phenyl-p-phenylene diamine and
the carbon black has a BET surface area within the range of about 36 to about 48 m.²/g., an oxygen content within the range of about 0.15 to about 0.65%, and a mineral oil absorbency within the range of about 1.15 to about 1.45 cc./g.

8. A rubber antidegradant composition according to claim 7 wherein the carbon black is in pellet form.

9. A rubber antidegradant composition according to claim 1 wherein
the antidegradant is N-1,3-dimethylbutyl-N'-phenyl-p-phenylene diamine and
the carbon black has a BET surface area within the range of about 42 to 46 m.²/g., an oxygen content of about 0.15 to about 0.65%, and a mineral oil absorbency within the range of about 1.15 to about 1.45 cc./g.

10. A rubber antidegradant composition according to claim 9 wherein the carbon black is in pellet form.

References Cited

UNITED STATES PATENTS

| | | | |
|---|---|---|---|
| 2,734,808 | 2/1956 | Biswell | 252—401 |
| 3,247,161 | 4/1966 | Cox | 260—41.5 |
| 3,251,798 | 5/1966 | Pollien | 106—307 |

FOREIGN PATENTS 638,294  6/1950  Great Britain.

MORRIS LIEBMAN, *Primary Examiner.*
MORRIS LIEBMAN, *Primary Examiner.*

U.S. Cl. X.R.

106—307, 308